United States Patent Office 3,445,460
Patented May 20, 1969

3,445,460
2,3,4,5 - TETRAHYDRO - 1,5, BENZOTHIAZEPINE-4-ONE-3-YL-ACETIC ACID AND ITS METHYL ESTER
Jacques Bourdais, Paris, France, assignor to Centre National de la Recherche Scientifique, Paris, France, a corporation of France
No Drawing. Filed Aug. 8, 1966, Ser. No. 570,730
Claims priority, application France, Aug. 11, 1965, 28,008
Int. Cl. C07d 93/40; A61k 27/00; A01n 9/22
U.S. Cl. 260—239.3                                    1 Claim

ABSTRACT OF THE DISCLOSURE

This invention is directed to 2,3,4,5-tetrahydro-1,5-benzothiazepine-4-one-3-yl-acetic acid and its methyl ester. These compounds are useful as fungicides.

---

The present invention relates to novel chemical compounds having valuable therapeutic properties and to processes for their preparation. More particularly it relates to the acids, their esters and their amides, and dirivatives, of 3,4-dihydro-1,4-(2H)benzothiazine-3-one, of the general formula:

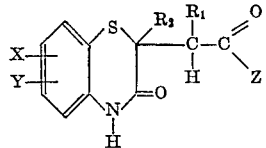

(I)

and of 2,3,4,5-tetrahydro-1,5-benzothiazepine-4-one, of the general formula:

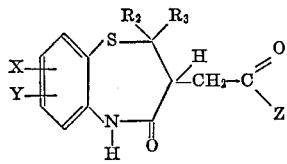

(II)

In these formulae, $R_1$, $R_2$, $R_3$, each designate hydrogen or an alkyl, aralkyl or aryl radical, excluding $R_1=R_2=H$, or $R_1$ and $R_2$ or $R_2$ and $R_3$ together form a ring having 5 to 7 carbon atoms jointly with the carbon atoms to which these symbols are linked in the formulae, X and Y designate members, the same or different, of the class constituted by hydrogen, halogens, alkyl and alkoxyl radicals having 1 to 5 carbon atoms, the trifluoromethyl group, the nitro group and amino groups, Z designates a hydroxyl group or an alkoxyl radical which may bear substituents, particularly hydroxyl or amino or aralkodyl, or an amino NRR', each of the symbols R and R' being a member of the class constituted by the hydrogen atom and the alkyl, aralkyl or aryl groups, without or with substituents, particularly with hydroxyl or amine functions as substituents.

The present invention provides a process for the preparation of compounds corresponding to the above-defined Formulae I and II.

According to the invention, an o-amino thiophenol of the formula:

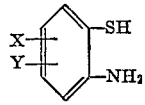

is reacted with an α-ethylenic diacid having at least 5 carbon atoms and corresponding to the formula:

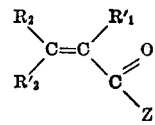

(III)

in which two of the symbols $R'_1$, $R_2$ and $R'_3$ have the significations given above for $R_1$, and $R_2$ and $R_3$ while one of the symbols $R'_1$ and $R'_3$ designates COOH or $CH_2COOH$, or also with a functional derivative of this x-ethylenic acid, of the ester or amide type or also an internal anhydride (taking into account the fact that one of the symbols $R'_1$ and $R'_3$ designates COOH or a group containing COOH).

In general, the reaction proceeds in two steps. The first results in an addition on the double bonds, with the formation of a 3=arolthio propionic derivative of the general formula:

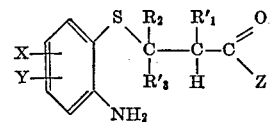

(IV)

The second results in a ring-formation to a derivative of benzothiazine (I) or of benzothiazepine (II).

The bicyclic derivatives (I) and (II) may be prepared without isolating the intermediates (IV). A reaction may also be carried out, particularly with esterification of the intermediates (IV), in order especially to facilitate their cyclisation to the compounds (I) or (II).

In general the reactions under consideration for performing the invention, example, the reactions of addition and cyclisation, may be carried out without diluent or in an organic diluent such as an alcohol. The addition reaction resulting in the compounds (IV) may be conducted either in the cold or with heating to a temperature of 50 to 200° C., preferably without diluent, when the production of benzothiazepines is concerned.

Another feature of the invention consists in the mutual transformation of acid, ester and amide functions of compounds (I) and (II).

Compounds (IV) are novel and form part of the invention.

The novel derivatives of benzothiazine (I) and benzothiazepine (II), as well as their intermediates (IV) are useful in therapeutics and as fungicides or as intermediate materials for the preparation of products intended for these applications.

The following non-limiting examples illustrate the invention, the degrees being centigrade degrees.

EXAMPLE 1

(2-methyl-3,4-dihydro-1,4-(2H) benzothiazine-3-one-2-yl)-acetic acid:

(A)

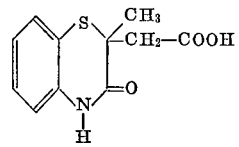

(3,4-dihydro-1,4(2H) benzothiazine-3-one-2-yl)-2-propionic acids-two diastereoisomers:

(B)

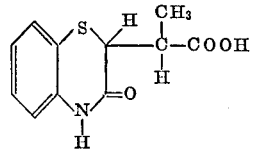

(a) These three acids are obtained by the reaction of 2-amino-benzene thiol with citraconic acid.

In the space of one hour, there is added with stirring, 313 g. (2.5 moles) of 2-amino benzenethiol (freshly distilled) to a solution kept under reflux, of 325 g. (2.5 moles) of citraconic acid in 800 ml. of ethanol; after the addition, stirring and refluxing on a water-bath is kept up for 7 hours, while a crystallisation is noted.

After standing at room temperature for 20 hours the solid precipitate is drained, washed with 200 ml. of ethanol and dried at 80°: 101 g. are obtained of practically pure acid melting at 270° (yield 17%). By recrystallisation from 150 ml. of dimethylformamide 75 g. of pure product having the same melting point is obtained.

The nuclear magnetic resonance spectrum (NMR) of this acid enables Formula B to be attributed to it.

The preceding ethanolic filtrates are evaporated under vacuum. The residue from evaporation is treated with 500 ml. of ethyl acetate and the suspension cooled to room temperature. After standing overnight, the precipitate is drained, washed with 200 ml. of ethyl acetate and dried at 80°; there is obtained 110 g. (yield 18.6%) of acid melting at 250°. By recrystallisation from 300 ml. of methoxy ethanol, there is obtained 67 g. (yield 11.3%) of pure product melting at 258°. From its NMR spectrum this acid possesses Formula B.

After evaporation under vacuum of the filtrates from the ethyl acetate solution, the residue is redissolved in 800 ml. of boiling ether. It is cooled and the ethereal solution is submitted to an extraction by 600 ml. of aqueous solution of 2 M $K_2CO_3$, which is decanted and cooled in an ice box: the potassium salt which crystallises is drained and redissolved in 500 ml. of water, from which the acid is precipitated by addition of a slight excess of concentrated HCl.

After draining the crystals, washing with water and drying at 90°, there is obtained 177 g. (yield 30%) of an acid melting at 145°. By recrystallisation from 450 ml. of ethyl acetate, there is obtained 132 g. (yield 22%) of pure acid melting at 151°. The NMR spectrum of this acid enables Formula A to be attributed to it.

The total yield of the reaction was 65.6% of the uncrystallised acids and 46% of pure acids after recrystallisation.

Analysis: $C_{11}H_{11}NO_3S$.—Calculated: C, 55.7%; H, 4.68%; N, 5.90%. Found: acid (A) of M.P. 151°: C, 55.78%; H, 4.89%; N, 5.78%; acid (B) of M.P. 270°: C, 55.48%; H, 4.91%; N, 5.95%; acid (B) of M.P. 258°: C, 55.49%, H, 4.82%; N, 5.91.

(b) A similar reaction effected using 0.1 mole of 2-amino benzenethiol and 0.1 mole of mesaconic acid, gives 7.0 g. (yield 30%) of a mixture of the preceding acids, melting at 210–215°. By recrystallisation from 70 ml. of propanol, there are obtained 3.0 g. of the acid (B) melting at 270° (identified by its infra-red spectrum).

EXAMPLE 2

Methyl (2-methyl-3,4-dihydro-1,4-(2H benzothiazine-3-one-2-yl)acetate:

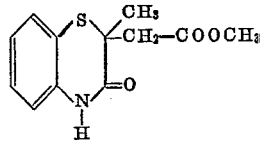

There is heated on a water-bath, at 50–60° for one hour, a solution of 71 g. (0.3 mole) of acid (A) melting at 151° and described in Example 1, in 200 ml. of a solution of 20% HCl in anhydrous methanol. After standing on ice overnight, the crystals deposited are drained, washed with 50 ml. of methanol, then with copious water and dried under vacuum; there are obtained 74 g. (yield 98% of the methylester, melting at 116–117°.

The latter is recrystallised in 180 ml. of anhydrous methanol and 63.5 g. (yield 84%) of pure product melting at 120° is obtained.

Analysis: $C_{12}H_{13}NO_3S$.—Calculated: C, 57.3%, H, 5.21%; N, 5.57%; Found: C, 57.29%; H, 5.22%; N, 5.47%.

EXAMPLES 3 AND 4

Methyl (3,4-dihydro-1,4-(2H) benzothiazine-3-one-2-yl)-2-propionates (two diastereoisomers):

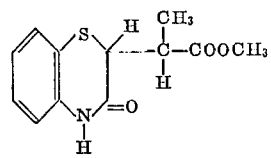

These two diastereoisomers are prepared by esterification of the corresponding acids.

(3) There is heated on a water-bath, at 60–70°, for 8 hours, a suspension of 99.5 g. (0.42 mole) of the acid (B) melting at 270° and described in Example 1 in 400 ml. of a 20% solution of HCl in anhydrous methanol. A change in the crystals of the suspension is observed. After standing overnight on ice, they are drained, washed with 100 ml. of methanol then with abundant water and dried at 90°; 95 g. (yield 90%) of the practically pure methyl ester, melting at 150–151°, are obtained.

By recrystallisation from 800 ml. of methanol, 77 g. (yield 73%) of pure product, melting at 151° (long colorless needles) are obtained.

Analysis: $C_{12}H_{13}NO_3S$. Calculated: C, 57.3%; H, 5.21%; N, 5.57%. Found: C, 57.31%; H, 5.33%; N, 5.35%.

(4) In an analogous manner to the procedure described in Examples 2 and 3, there is heated on a water-bath, for 2 hours 30 minutes, a suspension of 47.4 g. (0.2 mole) of the acid (B) melting at 258° and described in Example 1 in 200 ml. of a 20% methanolic solution of hydrochloric acid. After one night in an ice box, the crystals are drained, washed with methanol, then with water and dried; there is obtained 47 g. (yield 93.5%) of almost pure methylester, melting at 159°. By recrystallisation from 350 ml. of methanol, there are obtained 41.2 g. (yield 82%) of pure product, melting at 159.5° (elongated and colorless parallelopipeds).

Analysis: $C_{12}H_{13}NO_3S$. Calculated: C, 57.3%; H, 5.21%; N, 5.57%. Found: C, 57.50%; H, 5.42%; N, 5.56%.

EXAMPLE 5

The esters described in Examples 2–4 are obtained directly by reaction of 2-aminobenzenethiol with methyl citraconate or its stereoisomer, methyl mesaconate.

A mixture of 12.5 g. (0.1 mole) of 2-aminobenzenethiol and 15.8 g. (0.1 mole) of methyl citraconate are heated on an oil bath at 200°, for six hours. A release of methanol is observed indicating the ring-forming reaction to benzothiazine.

After cooling, the vitreous mass is redissolved in 60 ml. of ether and it is left on ice. The crystals deposited are drained, washed with ether and dried; 3.0 g. (yield 12%) of methylester melting at 150° are obtained; by recrystallisation of this from methanol there are obtained 2.6 g. of pure ester melting at 151° and identical (M.P. of mixture and infra-red spectrum) with the ester described in Example 3.

The preceding ethereal filtrates are washed with HCl diluted with water and are evaporated to give 18 g. of oily residue which crystallises slowly giving 2.0 g. (yield 8%) of ester melting at 120°, identical (M.P. of the mixture and infra-red spectrum) with the ester described in Example 2.

EXAMPLE 6

2-(6-chloro-3,4-dihydro-1,4-(2H) benzothiazine-3-one-2-yl) propionic acid:

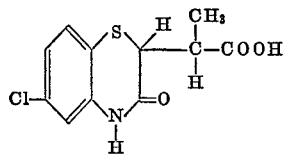

There is added, in the space of 40 minutes, a solution of 32 g. (0.2 mole) of 2-amino 4-chloro benzenethiol in 100 ml. of ethanol to a solution of 26 g. (0.2 mole) of citraconic acid in 150 ml. of ethanol heated under reflux, with stirring. After the addition, stirring is continued, with reflux, for three hours.

The solvent is evaporated under vacuum, and the residue taken up in 30 ml. of methanol and the crystallisation is induced. After standing on ice, the crystals are drained, washed with methanol and dried; 7 g. (yield 13%) of almost pure acid melting at 270° are obtained. The recrystallisation of the latter in methoxy-ethanol gives a pure product melting at 270°. The structure of this acid is proved by its NMR spectrum.

Analysis: $C_{11}H_{10}NO_3SCl$. Calculated: C, 48.6%; H, 3.71%; N, 5.15%. Found: C, 48.54%; H, 4.04%; N, 5.27%.

EXAMPLE 7

Methyl 2-(6-chloro-3,4-dihydro-1,4-(2H) benzothiazine 3-one 2-yl) propionate:

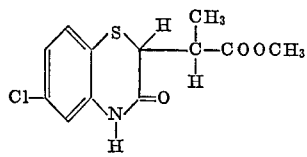

On a water-bath, at 60–70°, there are heated for 5 hours, a suspension of 5.7 g. (0.021 mole) of the acid described in Example 7, in 50 ml. of a 20% methanolic solution of HCl. After cooling on ice, the crystals are drained, washed with methanol, then with water and dried at 90°: 4.8 g. (yield 80%) of methylesters melting at 163° are obtained. By recrystallisation in 40 ml. of methanol, there is obtained 3.9 g. of pure ester melting at 167° (colourless needles).

Analysis: $C_{12}H_{12}NO_3SCl$. Calculated: C, 50.35%; H, 4.24%; N, 4.90%. Found: C, 50.34%; H, 4.31%; N, 4.98%.

EXAMPLE 8

α-(2-amino phenylthio)-methyl succinic acid:

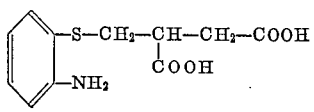

There are added, in the space of 30 minutes, 62.5 g. (0.5 mole) of 2-aminobenzenethiol to a solution of 65 g. (0.5 mole) of itaconic acid in 100 ml. of ethanol taken to reflux on a water-bath and stirred. The stirring is continued, with reflux, for thirty minutes, and the solution diluted with 100 ml. of water, with stirring and inducing crystallisation.

After one night in an ice box, the crystals are drained, washed with 100 ml. of 33% ethyl alcohol and dried at 80°: 110 g. (yield 86%) of almost pure acid melting at 146° is obtained. By recrystallisation in 800 ml. of ethyl acetate, there is obtained 88 g. of pure product melting at 146.5°.

This acid is soluble in both dilute alkaline carbonate solutions and strong acids such as HCl.

Analysis: $C_{11}H_{13}NO_4S$. Calculated: C, 51.7%; H, 5.14%; N, 5.48%. Found: C, 51.79%; H, 5.15%; N, 5.50%.

EXAMPLE 9

Dimethyl α-(2-amino-phenyl thio) methyl succinate

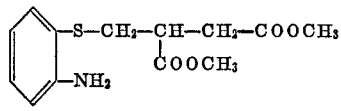

and p-nitro benzamzide thereof.

On a water-bath at 70°, for one hour thirty minutes, a solution of 12.7 g. (0.05 mole) of the acid described in Example 8 is heated in 50 ml. of 20% methanolic HCl solution. After cooling the hydrochloride of the dimethyl ester obtained is precipitated, by the addition of 50 ml. of anhydrous ether. The hydrochloride is redissolved in 60 ml. of water and immediately 50 ml. of 2 M $K_2CO_3$ are added; the oil precipitated is extracted with ether, the ethereal solution dried on $Na_2CO_4$ and the ether evaporatd to give 12.6 g. (yield 88%) of dimethyl ester. This diester may be characterized by its p-nitrobenzamide:

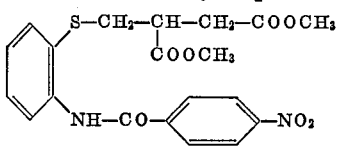

This derivative is prepared by adding a solution of 1.0 g. (0.0053 mole) of p-nitrobenzoyl chloride in 5 ml. of anhydrous benzene to a solution of 1.41 g. (0.005 mole) of diester and of 0.4 g. of pyridine in 10 ml. of anhydrous benzene. The mixture is then taken to reflux for 10 minutes. After cooling, the pyridine hydrochloride precipitate is drained, the solvent is removed from the filtrate under vacuum, and crystallization of the residue is induced by trituration with water. After recrystallization from 7 ml. of ethanol, there is obtained 1.5 g. (yield 65%) of p-nitrobenzamide melting at 84° (pale yellow crystals).

Analysis: $C_{20}H_{20}N_2O_7S$.—Calculated: C, 55.5%; H, 4.67%; N, 6.48%. Found: C, 55.37%; H, 4.78%; N, 6.52%.

EXAMPLE 10

Methyl(2,3,4,5-tetrahydro-1,5-benzothiazepine-4-one-3-yl)-acetate:

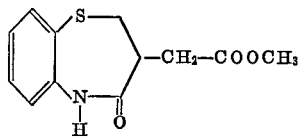

There are heated on an oil bath, for three hours, at 170°, then for 3 hours at 200°, a mixture of 12.5 g. (0.1 mole) of 2-aminobenzenethiol and of 15.8 g. (0.1 mole) of methyl itaconate containing 0.3% of hydroquinone. There is observed a release of methanol due to the reaction of ring formation. The mass obtained is dissolved in 50 ml. of benzene and the solution washed with 5% HCl, then with water, dried over $Na_2SO_4$ and evaporated under vacuum; it gives 15 g. of residue, the latter crystallizes by trituration with petroleum ether; after draining the crystals, washing the latter with 10 ml. of methanol and drying, there is obtained 5.2 g. (yield 21%) of product melting at 160–161°.

By recrystallization from 20 ml. of methanol, in the presence of "Norit" black, there is obtained 4.2 g. of the pure methyl ester melting at 164° (colorless parallelopipeds).

Analysis: $C_{12}H_{13}NO_3S$—Calculated: C, 57.3%; H, 5.21%; N, 5.57%. Found: C, 57.27%; H, 5.05%; N, 5.68%.

EXAMPLE 11

There is heated on an oil bath at 200°, for 3 hours, 8.5 g. (0.03 mole) of the crude diester described in Example 9; there is observed a release of methanol, then the mass is cooled and triturated with 15 ml. of methanol.

After standing on ice, the crystals deposited are drained, washed with methanol and dried under vacuum; there is obtained 4.6 g. (yield 61%) of product melting at 162–163°.

By recrystallization from methanol, there is obtained 3.7 g. of product melting at 164° and identical with the ester described in Example 10 (M.P. of the mixture).

EXAMPLE 12

(2,3,4,5-tetrahydro-1,5-benzothiazepine-4-one - 3 - yl)-acetic acid:

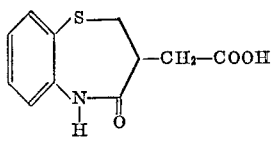

There is kept at room temperature, for 14 hours, a mixture of 2.5 g. (0.01 mole) of the ester described in Examples 10 and 11 and of 20 ml. of a 1 M KOH solution in 95% ethanol. The mixture is then heated on a water bath, for 10 minutes, cooled in an ice box and the leaflets deposited are drained. The latter are redissolved in 20 ml. of water. By acidifying the solution, the desired acid is obtained: yield=1.8 g. (namely 76%) of a product melting at 233°. By recrystallization from 50 ml. of methanol, there is obtained 1.4 g. of pure acid melting at 234°.

Analysis: $C_{11}H_{11}NO_3S$.—Calculated: C, 55.7%; H, 4.68%; N, 5.90%. Found: C, 55.69%; H, 4.67%; N, 6.06%.

EXAMPLE 13

2-piperidino-ethyl(2-methyl-3,4-dihydro-1,4-(2H) benzothiazine-3-one-2-yl)-acetate and hydrochloride:

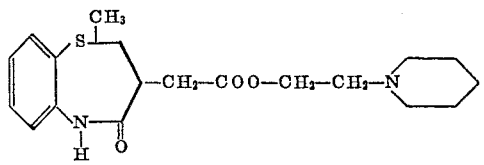

There is heated under reflux, for 2 hours 30 minutes, a solution of 5.94 g. (0.025 mole) of the acid A, melting at 151° and described in Example 1 and of 4.0 g. (0.027 mole) of N-piperidino-2-chloroethane in 50 ml. of anhydrous isopropanol. After cooling, a precipitate is filtered off, the filtrate is evaporated under vacuum and the residue redissolved in 50 ml. of boiling acetone. On cooling in an ice box, there are obtained crystals of the hydrochloride of the aminoester melting at 145° and 4.2 g. thereof are recovered (namely a yield of 44%).

Analysis: $C_{18}H_{25}N_2O_3SCl$.—Calculated: N, 7.28%. Found: N, 7.36%.

EXAMPLE 14

N-methyl (2-methyl - 3,4 - dihydro-1,4-(2H) benzothiazine-3-one-2-yl)-acetamide:

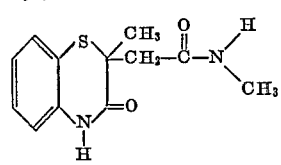

There is first prepared the chloride of acid A melting at 151° and described in Example 1, by heating on a water-bath, for 15 minutes, a solution of 11.85 g. (0.05 mole) of this acid and of 8.3 g. (0.07 mole) of thionyl chloride in 50 ml. anhydrous benzene. After having evaporated the solution under vacuum, the residue is triturated with petroleum ether, the crystals formed are drained (13 g.) and recrystallised from 150 ml. of cyclohexane, in the presence of "Norit" black: 7.2 g. (yield 57%) of the acid chloride is obtained melting about 70°.

A solution of 1.28 g. (0.005 mole) of the preceding acid chloride in 15 ml. of anhydrous benzene is added to a solution of 0.34 g. (0.011 mole) of methylamine in 15 ml. of anhydrous benzene, with cooling. The mixture is then taken to reflux for thirty minutes. After having evaporated the solvent under vacuum, the residue is triturated with 10 ml. of water, to induce its crystallisation. It is cooled in an ice box and the crystals drained, washed with 10 ml. of water, dried under vacuum; there are obtained 1.05 g. (yield 84%) of product melting at 160–170°.

By recrystallisation from 10 ml. of methanol, there is obtained 0.7 g. (yield 56%) of the pure amide melting at 200°.

Analysis: $C_{12}H_{14}N_2O_2S$.—Calculated: C, 57.6%; H, 5.65%; N, 11.2%. Found: C, 57.42%; H, 5.54%; N, 11.12%.

EXAMPLE 15

2-diethylamino-ethylamide of 2-methyl-3,4-dihydro - 1, 4-(2H)benzothiazine-3-one-2-yl-acetic acid:

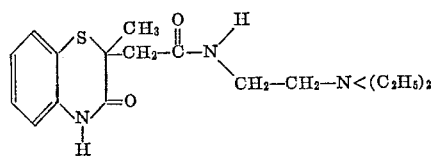

A solution of 2.56 g. (0.01 mole) of the acid chloride described in Example 14 in 20 ml. of anhydrous benzene is added to a solution of 1.16 g. (0.01 mole) of 2-diethylamino-ethylamine in 20 ml. of anhydrous benzene, with cooling. The mixture is heated under reflux for 30 minutes, then the solvent removed under vacuum. The residue is redissolved in 30 ml. of water, the solution is filtered on "Norit" black and the filtrate made alkaline with $K_2CO_3$.

The precipitated base is extracted with 200 ml. of ether, and the ethereal solution is dried over $Na_2SO_4$ and then evaporated; it yields a residue which crystallisation on contact with petroleum ether: there is obtained 2.0 g. (yield 60%) of product melting at 100°.

By recrystallisation from 6 ml. of acetone, there is obtained 1.4 g. of pure base melting at 103°.

Analysis: $C_{17}H_{25}N_3O_2S$.—Calculated: C, 60.8%; H, 7.53%; N, 12.5%. Found: C, 60.62%; H, 7.68%; N, 12.49%.

The foregoing description and examples are intended to be illustrative only. Any modification of or variation therefrom which conforms to the spirit of the invention is intended to be included within the scope of the appended claim.

I claim:
1. A compound selected from the class consisting of 2,3,4,5-tetrahydro - 1,5 - benzothiazepine-4-one-3-yl-acetic acid of the formula

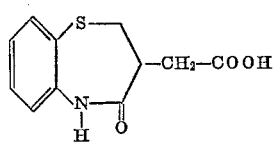

and the methyl ester thereof.

References Cited

UNITED STATES PATENTS 3,155,649  11/1964  Krapcho _____ 260—239.3

HENRY R. JILES, *Primary Examiner.*

R. T. BOND, *Assistant Examiner.*

U.S. Cl. X.R.

260—243, 470, 516, 558; 424—275